United States Patent
Zhang et al.

(10) Patent No.: US 11,853,614 B2
(45) Date of Patent: Dec. 26, 2023

(54) SYNCHRONOUS WRITE METHOD AND DEVICE, STORAGE SYSTEM AND ELECTRONIC DEVICE

(71) Applicant: SAMSUNG ELECTRONICS CO., LTD., Suwon-si (KR)

(72) Inventors: Heng Zhang, Shaanxi (CN); Wenwen Chen, Shaanxi (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 34 days.

(21) Appl. No.: 17/743,204

(22) Filed: May 12, 2022

(65) Prior Publication Data

US 2023/0168841 A1    Jun. 1, 2023

(30) Foreign Application Priority Data

Nov. 26, 2021   (CN) .......................... 202111422771.6

(51) Int. Cl.
    *G06F 3/06* (2006.01)
(52) U.S. Cl.
    CPC .......... *G06F 3/0659* (2013.01); *G06F 3/0604* (2013.01); *G06F 3/0679* (2013.01)
(58) Field of Classification Search
    CPC ..... G06F 3/0659; G06F 3/0604; G06F 3/0679
    See application file for complete search history.

(56) References Cited

U.S. PATENT DOCUMENTS

| | | | |
|---|---|---|---|
| 8,006,047 | B2 | 8/2011 | DeSOUZA et al. |
| 10,248,349 | B2 | 4/2019 | Daloze et al. |
| 10,817,183 | B2 | 10/2020 | Katayama |
| 2019/0220404 | A1 | 7/2019 | Hwang |
| 2020/0201570 | A1 | 6/2020 | Kim et al. |

FOREIGN PATENT DOCUMENTS

| | | |
|---|---|---|
| CN | 108268219 | 7/2018 |
| CN | 109471596 | 3/2019 |
| CN | 110515861 | 11/2019 |
| KR | 10-2020-0044646 | 4/2020 |

*Primary Examiner* — Gurtej Bansal
(74) *Attorney, Agent, or Firm* — F. Chau & Associates, LLC

(57) ABSTRACT

A synchronous write method includes: receiving a synchronous write command of a process; if a process state table indicates that another synchronous write command of the process has not been added to a command queue, adding the synchronous write command to the command queue; if the process state table indicates that the other synchronous write command has been added to the command queue, adding an order preserving command to the command queue, and then adding the synchronous write command to the command queue; and sending commands in the command queue to a storage device according to the order of the commands in the command queue. The order preserving command is used to indicate that a synchronous write commands located before the order preserving command in the command queue is to be executed prior to the synchronous write command by the storage device.

20 Claims, 9 Drawing Sheets

SYNCHRONOUS WRITE METHOD AND DEVICE, STORAGE SYSTEM AND ELECTRONIC DEVICE

CROSS-REFERENCE TO RELATED APPLICATIONS

This U.S. non-provisional patent application claims priority under 35 U.S.C. § 119 to Chinese Patent Application No. 202111422771.6 filed on Nov. 26, 2021, in the Chinese Intellectual Property Office, the disclosure of which is incorporated by reference in its entirety herein.

TECHNICAL FIELD

The present disclosure relates to data storage technology, and more specifically, to a synchronous write method and device, a storage system, and an electronic device.

BACKGROUND

In certain operating systems, synchronous writing accounts for a relatively high ratio of all write operations. Synchronous writing is a time-consuming operation compared to ordinary or asynchronous writing. Therefore, increasing the performance of synchronous writing may greatly increase speed of system operation. A kernel of an operating system may use different techniques for ensuring that all data to be written to a storage device is actually written. Data stored using a first one of these techniques ensures that all the data is written, but takes a long time to complete. A second one of these techniques writes data at a higher speed than the first technique, but it does not ensure that all the data will be written. A third one of these techniques has the fastest speed and ensures that all the data will be written, but takes a long time to complete when multi-threading, thereby resulting in poor performance.

SUMMARY

At least one embodiment of the present disclosure provides a synchronous write method and device, a storage system and an electronic device. The embodiment may increase performance of a synchronous write when multiple threads are executed simultaneously.

According to an exemplary embodiment of the present disclosure, there is provided a synchronous write method that includes: receiving a first synchronous write command of a first process; if a process state table indicates that at least one other synchronous write command of the first process has not been added to a command queue, adding the first synchronous write command to the command queue; if the process state table indicates the at least one other synchronous write commands of the first process has been added to the command queue, adding an order preserving command to the command queue, and then adding the first synchronous write command to the command queue; and sending commands in the command queue to a storage device according to the order of the commands in the command queue. The order preserving command is used to indicate that a synchronous write command located before the order preserving command in the command queue is to be executed prior to the first synchronous write command by the storage device.

In an embodiment, the process state table includes process state information, and the method further includes: if the process state information of the first process in the process state table indicates that at least one other synchronous write command of the first process has not been added to the command queue, changing the process state information of the first process to indicate that at least one other synchronous write command of the first process has been added to the command queue, after adding the first synchronous write command to the command queue; and if the process state information of the first process in the process state table indicates that at least one other synchronous write command of the first process has been added to the command queue, changing process state information of at least one other process in the process state table to indicate that no synchronous write command of the at least one other process has been added to the command queue, after adding the order preserving command to the command queue.

In an embodiment, after receiving the first synchronous write command of the first process, the method further includes: if the process state table does not include a process identification number of the first process, determining that the process state table indicates that the at least one other synchronous write command of the first process has not been added to the command queue; and if the process state table includes the process identification number of the first process, determining that the process state table indicates that the at least one other synchronous write command of the first process has been added to the command queue.

In an embodiment, the above method further includes: if the process state table indicates that the at least one other synchronous write command of the first process has not been added to the command queue, saving the process identification number of the first process in the process state table after adding the first synchronous write command to the command queue; and if the process state table indicates that the at least one other synchronous write command of the first process has been added to the command queue, removing process identification numbers of at least one other process in the process state table after adding the order preserving command to the command queue.

In an embodiment, the process state table further includes a type of a synchronous write command that has been added to the command queue last time, wherein the type indicates whether the synchronous write command points to a data page or a node page, and the above method further includes: determining the type of the first synchronous write command of the first process and the type of the synchronous write command that has been added to the command queue last time; and if the process state table indicates that the at least one other synchronous write command of the first process has been added to the command queue, and the type of the first synchronous write command of the first process is different from the type of the synchronous write command that has been added to the command queue last time, adding the order preserving command to the command queue, and then adding the first synchronous write command to the command queue.

In an embodiment, the above method further includes: if the process state table indicates that the at least one other synchronous write command of the first process has been added to the command queue, and the types of the first synchronous write command that carries a logical address and the synchronous write command that has been added to the command queue last time are both synchronous write commands pointing to a data page, determining, according to a logical address state table, whether data has been written to the logical address carried by the first synchronous write command; and if the data has been written, adding the order preserving command to the command queue, and then adding the first synchronous write command to the command queue.

In an embodiment, after adding the order preserving command to the command queue, the method further includes: changing states of other logical addresses in the logical address state table to not having written data.

According to an exemplary embodiment of the present disclosure, there is provided a synchronous write device that includes: a receiver configured to receive a first synchronous write command of a first process; a controller configured to, if a process state table indicates that at least one other synchronous write command of the first process has not been added to a command queue, add the first synchronous write command to the command queue, and if the process state table indicates that the at least one other synchronous write command of the first process has been added to the command queue, add an order preserving command to the command queue, and then add the first synchronous write command to the command queue, wherein the order preserving command indicates that an synchronous write command located before the order preserving command in the command queue is to be executed prior to the first synchronous write command by a storage device; and a transmitter configured to send commands in the command queue to the storage device according to the order of the commands in the command queue.

In an embodiment, the process state table includes process state information, the controller is further configured to, if the process state information of the first process in the process state table indicates that at least one other synchronous write command of the first process has not been added to the command queue, change the process state information of the first process to indicate that at least one other synchronous write command of the first process has been added to the command queue, after adding the first synchronous write command to the command queue, and if the process state information of the first process in the process state table indicates that the at least one other synchronous write command of the first process has been added to the command queue, change process state information of at least one other process in the process state table to indicate that no synchronous write command of the at least one other process is added to the command queue, after adding the order preserving command to the command queue.

In an embodiment, the controller is further configured to, if the process state table does not include a process identification number of the first process after receiving the first synchronous write command of the first process, determine that the process state table indicates that at least one other synchronous write command of the first process have not been added to the command queue, and if the process state table includes the process identification number of the first process, determine that the process state table indicates that at least one other synchronous write command of the first process have been added to the command queue.

In an embodiment, the controller is further configured to update the process state table, if the process state table indicates that the at least one other synchronous write command of the first process has not been added to the command queue, save the process identification number of the first process in the process state table after adding the first synchronous write command to the command queue, and if the process state table indicates that the at least one other synchronous write command of the first process has been added to the command queue, removing process identification numbers of at least one other process in the process state table after adding the order preserving command to the command queue.

In an embodiment, the process state table further includes the type of a synchronous write command that has been added to the command queue last time, the type indicating whether the synchronous write command points to a data page or a node page, and the controller is further configured to determine the type of the first synchronous write command of the first process and the type of the synchronous write command that has been added to the command queue last time, and if the process state table indicates that the at least one other synchronous write command of the first process has been added to the command queue, and the type of the first synchronous write command of the first process is different from the type of the synchronous write command that has been added to the command queue last time, add the order preserving command to the command queue, and then add the first synchronous write command to the command queue.

In an embodiment, the controller is further configured to maintain a logical address table indicating whether an address corresponding to the storage device has written data, if the process state table indicates that the at least one other synchronous write command of the first process has been added to the command queue, and the types of the first synchronous write command that carries a logical address and the synchronous write command that has been added to the command queue last time are both synchronous write commands pointing to a data page, determine, according to the logical address state table, whether data has been written to the logical address carried by the first synchronous write command, and if the data has been written, add the order preserving command to the command queue, and then add the first synchronous write command to the command queue.

In an embodiment, the controller is further configured to change states of other logical addresses in the logical address state table to not having written data after adding the order preserving command to the command queue.

According to an exemplary embodiment of the present disclosure, there is provided an electronic system, including: a storage device; and a host processor configured to execute the above synchronous write method to control the storage device to store data.

According to an exemplary embodiment of the present disclosure, there is provided a host storage system, including: a host; and a storage device. The host is configured to execute the above synchronous write method to control the storage device to store data.

According to an exemplary embodiment of the present disclosure, there is provided a universal flash system, including: a universal flash host; a universal flash interface; and a universal flash device configured to communicate with the universal flash host through the universal flash interface. The universal flash host is configured to execute the above synchronous write method to control the universal flash host to store data.

According to an exemplary embodiment of the present disclosure, there is provided a data center, including: an application server; and a storage server configured to communicate with the application server through a network. The application server is configured to execute the above synchronous write method to control the storage server to store data.

According to an exemplary embodiment of the present disclosure, there is provided a storage system, including: a file system layer, a driver layer and a storage device. The file system layer is configured to send a first synchronous write command of a first process to the driver layer, and the driver layer configured to execute the above synchronous write method.

According to an exemplary embodiment of the present disclosure, there is provided a computer-readable storage medium storing a computer program. The computer program, when executed by a processor, implements the synchronous write method of the present disclosure.

According to an exemplary embodiment of the present disclosure, there is provided an electronic device, including: at least one processor; and at least one memory storing computer executable instructions. The computer executable instructions, when executed by the at least one processor, cause the at least one processor to execute the synchronous write method of the present disclosure.

Embodiments of the synchronous write method and device, storage system, and electronic device of the present disclosure may consider process information of a synchronous write command. On the basis of guaranteeing the issuing order of the synchronous write commands of the same process, the number of order preserving commands issued to the storage device may be reduced, and synchronous write performance in multi-threaded concurrency scenarios may be increased.

BRIEF DESCRIPTION OF DRAWINGS

The above and other purposes and features of the exemplary embodiments of the present disclosure will become clearer through the following descriptions made in conjunction with the figures schematically illustrating the embodiments, in which.

DETAILED DESCRIPTION OF THE EMBODIMENTS

The following embodiments are provided to assist the reader in gaining a comprehensive understanding of the methods, apparatuses, and/or systems described herein. However, it should be understood that the disclosure is not intended to be limited to the disclosed specific forms, and the disclosure includes all modifications, equivalents, and substitutions within the spirit and technical scope of the disclosure. For example, the order of operations described herein are merely examples, and are not limited to those set forth herein, but may be changed.

Unless the context clearly indicates otherwise, the singular form is also intended to include the plural form. The terms "comprises", "includes" and "has" indicate the presence of stated features, numbers, operations, components, elements, and/or combinations thereof, but do not exclude the presence or addition of one or more other features, numbers, operations, components, elements, and/or combinations thereof.

Figure 1:
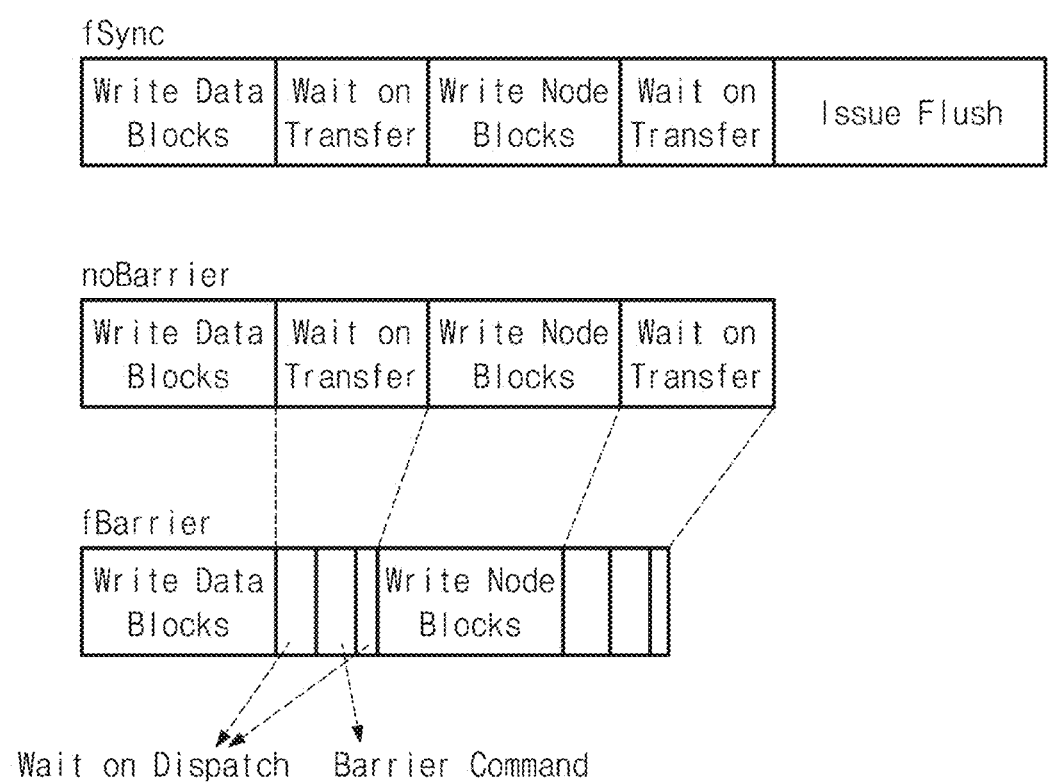
FIG. 1 is a schematic diagram of synchronous write using a fSync type, a noBarrier type and an fBarrier type.

Three manners for synchronously writing data used in a LINUX operating system such as fSync, noBarrier, and fBarrier are introduced briefly as shown in FIG. 1.

In fSync, data in a page cache is forced to persist to guarantee that the most recently written data will not reach the storage device (e.g., flash memory) before the previous written data, and then the next synchronous write command will be issued. The fSync mechanism mainly includes two steps of wait on transfer and flush. However, these two steps have a lot of overhead. Therefore, an fSync call affects the performance of orderly writing. In fSync, data storage order is not disrupted, and all the data is guaranteed to be written to the storage device. However, fSync has a large overhead, which results in poor performance.

In noBarrier, as compared with fSync, a flush operation is omitted. Omission of the flush operation can increase performance, but it may not guarantee the orderly storage of data. The speed of noBarrier is about 5-6 times that of fSync, but all the data is not guaranteed to be written to the storage device.

In fBarrier, a barrier command is added between two write operations, and when the previous write operation reaches a Small Computer System Interface (SCSI) layer, the next write operation can be issued without waiting for the previous write operation to reach the storage device. Also, the barrier command may guarantee that the data is flushed to the storage device orderly. Therefore the overhead of wait on transfer and flush is reduced. The fBarrier manner has the fastest speed and has the same performance as the fSync manner, but the performance is poor compared with the noBarrier manner during multi-threaded scenarios.

In order to guarantee data consistency, a write data command needs to be issued to the storage device before a write node command. A Flash Friendly File System (F2FS) adds a barrier command between the write data command and the write node command, and issues the barrier command to a barrier-enabled storage device. After the barrier-enabled storage device receives the barrier command, it will guarantee that the write data command previous to the barrier command is flushed to the storage device (e.g., flash memory) before the write node command. However, as the number of threads increases, the synchronous write performance will continue to decrease since fBarrier uses a wait on dispatch mechanism to replace the wait on transfer mechanism and utilizes the parallelism of Direct Memory Access (DMA) transmission. However, after receiving the barrier command, the storage device needs to perform an order preserving operation, which increases overhead. In particular, the fBarrier mechanism inserts the order preserving commands between each write data command and write node command in multiple threads. Accordingly, when the number of threads increases, the performance loss of the storage device is very large, which may offset any increase in performance due to wait on dispatch.

Figure 2:
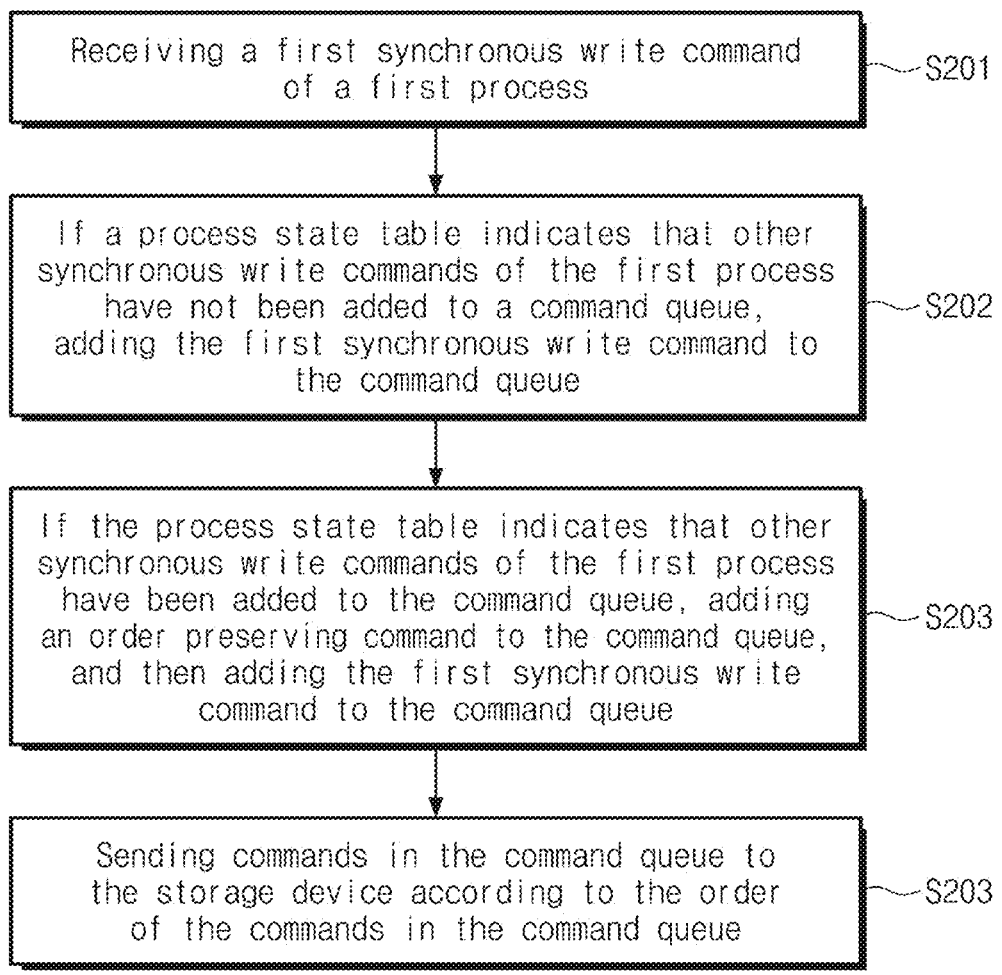
FIG. 2 is a flowchart of a synchronous write method according to an exemplary embodiment of the present disclosure.

An exemplary embodiment of the present disclosure provides a synchronous write method that can support multiple threads without incurring a drop in performance FIG. 2 illustrates steps of synchronous write method.

The method of FIG. 2 includes receiving a first synchronous write command of a first process is received (step 201). The first synchronous write command is any one of multiple synchronous write commands received by the first process.

The method of FIG. 2 further includes adding the first synchronous write command to a command queue, if a process state table indicates that another synchronous write command of the first process has not been added to the command queue (step S202). The process state table is used to indicate whether other synchronous write commands of a process have been added to the command queue.

If the process state table indicates that another synchronous write command of the first process has not been added to the command queue in step S202, the related information of the first synchronous write command (such as the identification of the first synchronous write command) may be added to the command queue.

The method of FIG. 2 further includes adding an order preserving command to the command queue and then adding the first synchronous write command is added to the command queue, if the process state table indicates that another synchronous write command of the first process has been added to the command queue (step S203). The order preserving command is used to indicate that at least one synchronous write command located before the order preserving command in the command queue is to be executed prior to the first synchronous write command by a storage device.

If the process state table indicates that another synchronous write command of the first process has been added to the command queue, the related information of the order preserving command (such as the identification of the order preserving command) may be added to the command queue, and then the related information of the first synchronous write command (such as the identification of the first synchronous write command) is added to the command queue.

The method of FIG. 2 further includes sending commands in the command queue to the storage device according to the order of the commands in the command queue (Step S204).

In an embodiment, the process state table is implemented by a first process state table that includes a process identification number and process state information. In another embodiment, the process state table is implemented by a second process state table that includes only the process identification number.

In the first process state table, the process state information indicates whether other commands of the corresponding process have been added to the command queue. The process state information may be implemented in the form of flag bits, for example, 0 represents determining that other commands have not been added to the command queue, and 1 represents determining that others commands have been added to the command queue. If the second process state table includes the identification number of the first process, it indicates that at least one other command has been added to the command queue, and if the second process state table does not include the identification number of the first process, it indicates that others command have not been added to the command queue.

In order to manage the synchronous write command of the process in real time to determine whether the order preserving command needs to be issued before the synchronous write command, an embodiment of the present disclosure may need to update the process state table in real time.

When the first process state table is used, in response to a new first synchronous write command for a first process, it is determined whether process state information of the first process in the first process state table indicates that at least one other synchronous write command of the first process has been added to the command queue.

If it is determined that at least one synchronous write command of the first process has not been added to the command queue, then the first synchronous write command is added to the command queue and then the process state information of the first process in the first process state table is changed to indicate that other synchronous write commands of the first process have been added to the command queue.

If it is determined that at least one synchronous write command of the first process has been added to the command queue, an order preserving command is added to the command queue and then the process state information of other processes in the first process state table are changed to indicate that no synchronous write command of the other processes have been added to the command queue. The process state information of the first process in the first process state table still maintains that other synchronous write commands of the first process have been added to the command queue, and the first synchronous write command is added to the command queue. Through this embodiment, it may be conveniently and quickly determined whether other synchronous write commands of the first process have been added to the command queue. Regarding to the execution order of the step of updating the process state table (e.g., the first process state table) and the step of adding the first synchronous write command to the command queue, the step of updating the process state table may be first executed and then the step of adding the first synchronous write command to the command queue may be executed, or the step of adding the first synchronous write command to the command queue may also be first executed and then the step of updating the process state table may be executed. In some cases, the step of updating the process state table and adding the first synchronous write command to the command queue may be executed in parallel or at substantially the same time.

If the first process state table does not include or reference the first process, it indicates that there is no other synchronous write commands of the first process in the command queue, and after adding the first write command to the command queue, the identification of the first process is added to the first process state table, and the process state information of the first process is changed to indicate that at least one other synchronous write command of the first process has been added to the command queue.

When the second process state table is used, in response to a new first synchronous write command for a first process, it is determined whether the process state table indicates that at least one other synchronous write command of the first process has been added to the command queue.

If it is determined that at least one other synchronous write command of the first process has not been added to the command queue, the process identification number of the first process is saved to the second process state table after adding the first synchronous write command to the command queue.

If it is determined from the second process state table that at least one other synchronous write command of the first process has been added to the command queue, process identification numbers of other processes in the process state table are removed and the identification number of the first process in the process state table is preserved, after adding the order preserving command to the command queue. Then the first synchronous write command is added to the command queue. Regarding the execution order of the step of updating the second process state table and the step of adding the first synchronous write command to the command queue, the step of updating the second process state table may be executed first and then the step of adding the first synchronous write command to the command queue may be executed, or the step of adding the first synchronous write command to the command queue may be executed first and then the step of updating the second process state table may be executed. In some cases, the step of updating the second process state table and adding the first synchronous write command to the command queue may be executed in parallel or at substantially the same time.

According to an embodiment, only other processes in the process state table are updated when the order preserving command is issued, because other processes are sent before the order preserving command, and the preserving command has already performed order preserving of the other processes. For example, the process state information of other processes are updated or identification numbers of other processes are removed from the process state table.

Figure 3:
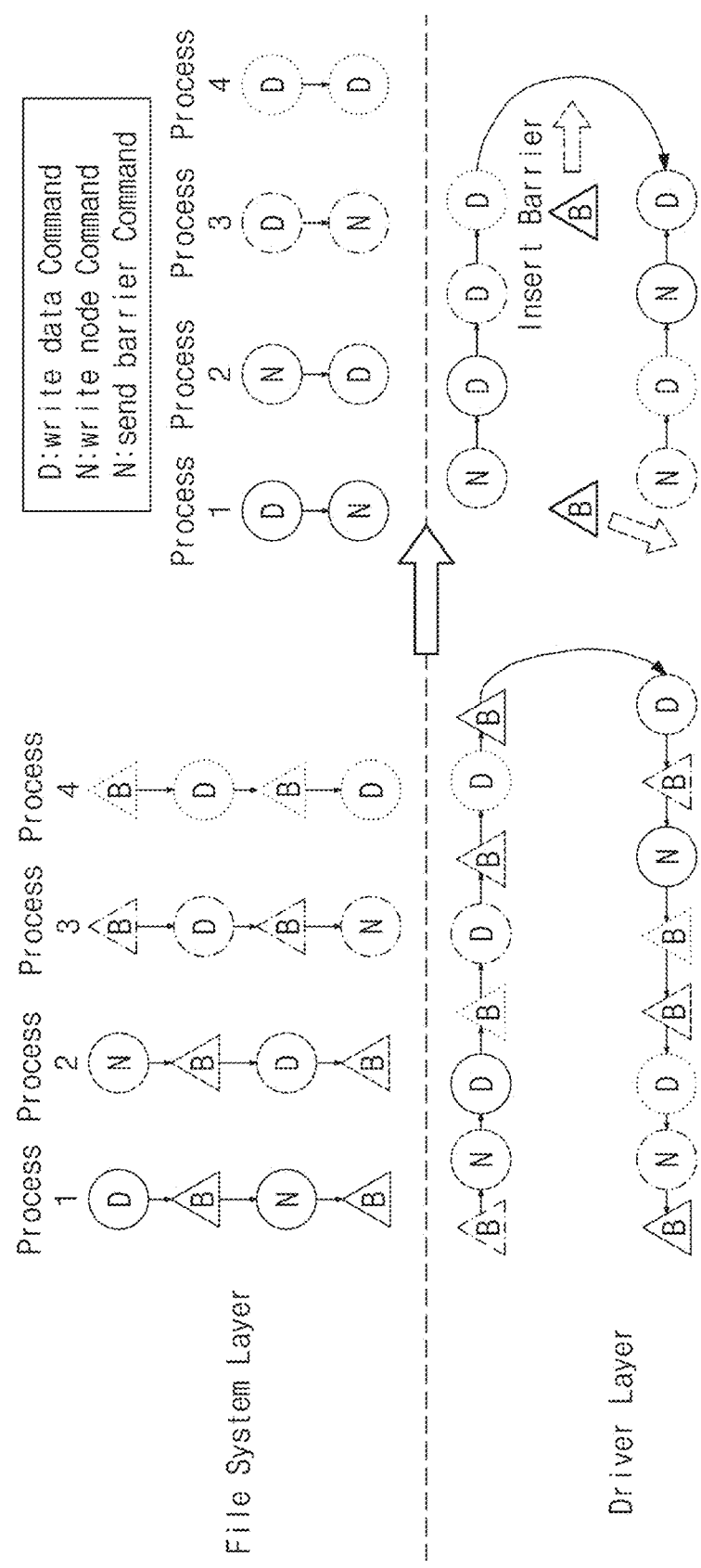
FIG. 3 is a schematic diagram illustrating a comparison between a synchronous write method according to an exemplary embodiment of the present disclosure and another synchronous write method.

The left side of FIG. 3 illustrates a comparative example and the right side of FIG. 3 illustrates a technique according to an embodiment of the disclosure. As shown in the left side of FIG. 3, in order to implement the same order preserving effect, 8 order preserving commands (barrier) need to be issued, because the current manner of fBarrier needs to issue barrier commands between the data and the node of each thread in multiple threads, which is likely to cause unnecessary barrier commands. As shown in the right side of FIG. 3, two Bs (Barriers) are sent next to each other. At the time, they may be combined, that is, just one order preserving command may be sent. Also, the write order of data and nodes between different processes do not need to be guaranteed, so there is no need to issue the order preserving commands between data and nodes between different processes. Therefore, in the embodiment of the present disclosure shown in the right side of FIG. 3, only two barrier commands are needed, which may greatly reduce performance loss caused by processing barrier commands.

In an exemplary embodiment, after a synchronous write command is issued from a File system layer, since the synchronous write command carries a large amount of information, it may be divided into two or more commands after reaching a Block layer. Thus, after the command is sent to the Driver layer, it is packaged into multiple synchronous write commands, which may include multiple synchronous write commands pointing to Data and/or multiple synchronous write commands pointing to Node. When such multiple synchronous write commands are sent downwards, it is not necessary to add the order preserving command Barrier between two adjacent synchronous write commands of the same process. In order to further reduce the number of times that the order preserving command (Barrier) is issued, the type of synchronous write command may also be considered.

In an embodiment of the present disclosure, the process state table may further include the type of a synchronous write command of the first process that has been added to the command queue last time. The type of the synchronous write command includes a synchronous write command pointing to a data page and a synchronous write command pointing to a node page. Thus, the type may indicate whether the command points to a data page or a node page. Regarding the two above process state tables, they may both include the type of the synchronous write command of the first process that has been added to the command queue last time, and the type of the first synchronous write command just issued to the command queue. The type of the first synchronous write command may be updated in real time to the type of a synchronous write command of the first process that has been added to the command queue last time.

A synchronous write process according to an embodiment includes: if the process state table indicates that at least one other synchronous write command of the first process has been added to the command queue, determining the type of the first synchronous write command of the first process and the type of the synchronous write command that has been added to the command queue last time. The following situations exist in two synchronous write commands before and after:

1. If the type of the first synchronous write command of the first process is different from the type of the synchronous write command that has been added to the command queue last time, the order preserving command is added to the command queue, and then the first synchronous write command is added to the command queue.

2. If the type of the first synchronous write command of the first process and the type of the synchronous write command that has been added to the command queue last time are both synchronous write commands pointing to Node, there is no need to add the order preserving command in the command queue, and the first synchronous write command is directly added to the command queue.

3. If the type of the first synchronous write command of the first process and the type of the synchronous write command that has been added to the command queue last time are both synchronous write commands pointing to Data, it is determined whether a logical address carried by the first synchronous write command has written data according to Logical Block Address (LBA) state table (i.e. logical address state table). If data has been written to the logical address, the order preserving command is first added to the command queue, and then the first synchronous write command is added to the command queue. If data has not been written to the logical address, the first synchronous write command is directly added to the command queue.

In the scenario where synchronous write commands all point to Data, the LBA state table for indicating whether an address in the corresponding LBA of the storage device has data written may be maintained.

If data has been written to the logical address, after adding the order preserving command to the command queue, and then adding the first synchronous write command to the command queue, the states of other logical addresses in the LBA state table may be changed to indicate that data has not been written, and the state of the logical address carried by the first synchronous write command remains unchanged. If data has not been written to the logical address, after adding the first synchronous write command to the command queue, the state of the logical address carried by the first synchronous write command in the LBA state table is changed to indicate that the data has been written.

According to this embodiment, when it is determined that the process state table indicates that at least one other synchronous write command of the first process has been added to the command queue, considering the types of synchronous write commands at the same time may further reduce the number of times the order preserving commands are issued.

Figure 4:
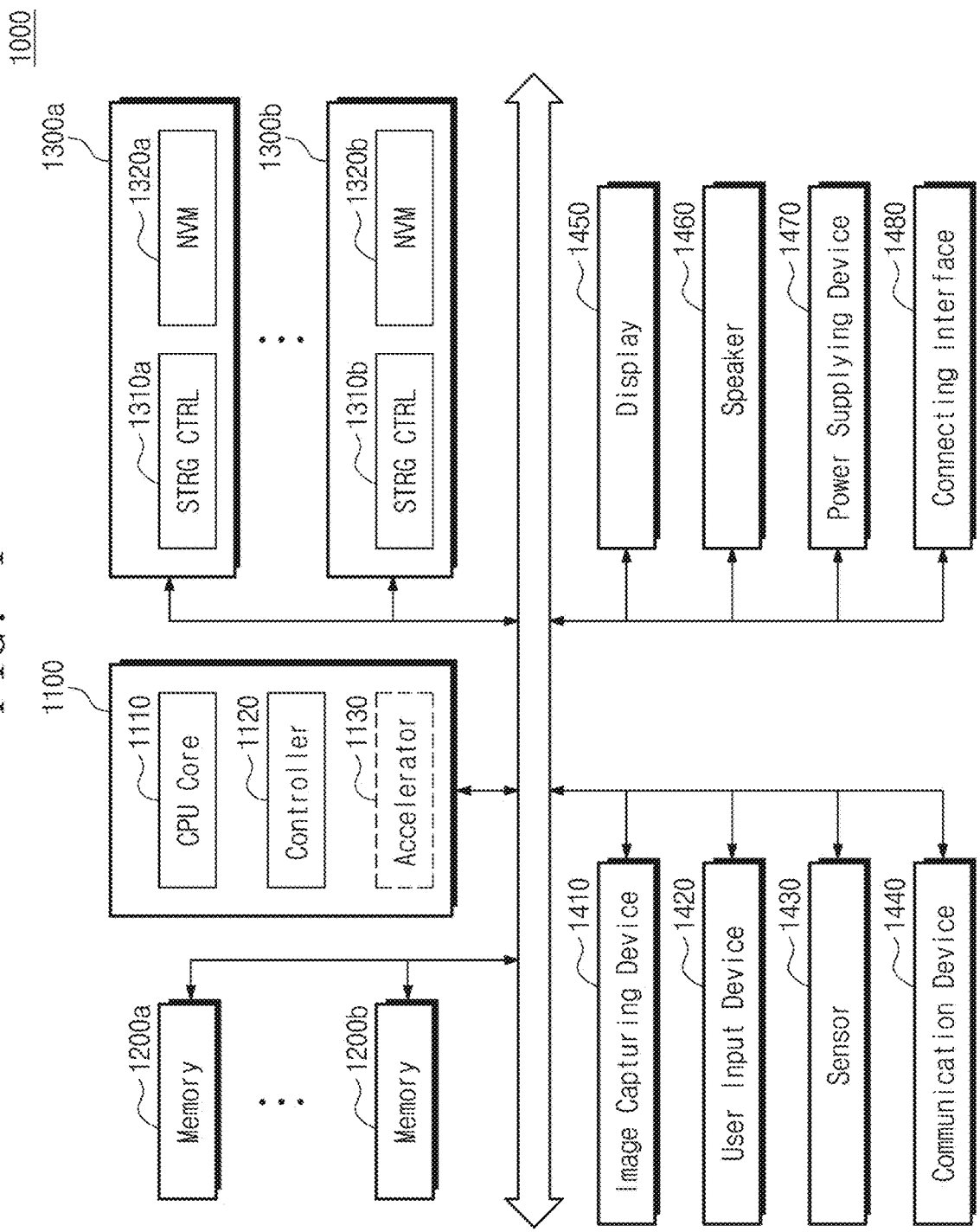
FIG. 4 is a schematic diagram of an electronic system according to an exemplary embodiment of the present disclosure.

FIG. 4 illustrates a schematic diagram of a system 1000 to which a storage device is applied, according to an embodiment of the present disclosure. The system 1000 may be a mobile system, such as a portable communication terminal (for example, a mobile phone), a smart phone, a tablet personal computer (PC), a wearable device, a healthcare device, or an Internet of Things (IOT) device. However, the system 1000 of FIG. 4 is not necessarily limited to a mobile system, and it may be a PC, a laptop computer, a server, a media player, or a automotive device (for example, a navigation device).

Referring to FIG. 4, the system 1000 may include a main processor 1100, memories (for example, 1200*a* and 1200*b*), and storage devices (for example, 1300*a* and 1300*b*). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, an application processor, or the like.

The main processor 1100 may include at least one central processing unit (CPU) core 1110, and further include a controller 1120 for controlling the memories 1200*a* and 1200*b* and/or the storage devices 1300*a* and 1300*b*. In some embodiments, the main processor 1100 may further include an accelerator 1130, which is a dedicated circuit for high-speed data operations such as artificial intelligence (AI) data operations. The accelerator 1130 may include a graphics processing unit (GPU), a neural processing unit (NPU), and/or a data processing unit (DPU), etc., and be implemented as a chip that is physically separate from other components of the main processor 1100.

The memories 1200*a* and 1200*b* may be used as a main storage device of the system 1000. Although the memories 1200*a* and 1200*b* may include a volatile memory, such as Static Random Access Memory (SRAM) and/or a Dynamic Random Access Memory (DRAM), etc., each of the memories 1200*a* and 1200*b* may include non-volatile memories, such as a Flash memory, a Phase Change Random Access Memory (PRAM) and/or a Resistive Random Access Memory (RRAM), etc. The memories 1200*a* and 1200*b* may be implemented in the same package as the main processor 1100.

The storage devices 1300*a* and 1300*b* may serve as non-volatile storage devices, and be configured to store data regardless of whether power is supplied thereto, and have larger storage capacity than the memories 1200*a* and 1200*b*. The storage devices 1300*a* and 1300*b* may respectively include storage controllers (STRG CTRLs) 1310*a* and 1310*b* and non-volatile memories (NVM) 1320*a* and 1320*b* which are configured to store data through control of the storage controllers 1310*a* and 1310*b*. Although the NVMs 1320*a* and 1320*b* may include flash memories having a two-dimensional (2D) structure or a three-dimensional (3D) V-NAND structure, the NVMs 1320*a* and 1320*b* may include other types of NVMs, such as PRAM and/or RRAM.

The storage devices 1300*a* and 1300*b* may be physically separated from the main processor 1100 and included in the system 1000, or may be implemented in the same package as the main processor 1100. In addition, the storage devices 1300*a* and 1300*b* may be solid-state devices (SSDs) or memory cards, and may be removably coupled with other components of the system 100 through an interface such as the connecting interface 1480 that will be described later. The storage devices 1300*a* and 1300*b* may be devices to which a standard protocol, such as a Universal Flash Storage (UFS), an embedded Multimedia Card (eMMC), or a NVMe is applied, but are not limited thereto.

The image capturing device 1410 may capture still images or moving images. The image capturing device 1410 may include a camera, a camcorder, and/or a webcam, etc.

The user input device 1420 may receive various types of data input by a user of the system 1000, and includes a touch pad, a keypad, a keyboard, a mouse, a microphone, and the like.

The sensor 1430 may detect various types of physical quantities that may be obtained from the outside of the system 1000, and convert the detected physical quantities into electrical signals. The sensor 1430 may include a temperature sensor, a pressure sensor, an illuminance sensor, a position sensor, an acceleration sensor, a biosensor, and/or a gyroscope sensor, etc.

The communication device 1440 may send and receive signals between other devices outside the system 1000 according to various communication protocols. The communication device 1440 may include an antenna, a transceiver, a modem, or the like.

The display 1450 and the speaker 1460 may serve as output devices, which are configured to respectively output visual information and auditory information to the user of the system 1000.

The power supplying device 1470 may appropriately convert power supplied from a battery (not shown) embedded in the system 1000 and/or an external power source, and supply the converted power to each component of the system 1000.

The connecting interface 1480 may provide a connection between the system 1000 and an external device, which is connected to the system 1000 and capable of transmitting and receiving data to and from the system 1000. The connecting interface 1480 may be implemented by using various interface schemes, for example, Advanced Technology Attachment (ATA), Serial ATA (SATA), external SATA (e-SATA), Small Computer System Interface (SCSI), Serial attached SCSI (SAS), Peripheral Component Interconnect (PCI), PCI express (PCIe), NVMe, IEEE 1394, a Universal Serial Bus (USB) interface, a Secure Digital (SD) card interface, a Multi-media Card (MMC) interface, an embedded Multimedia Card (eMMC) interface, a UFS interface, an embedded UFS (eUFS) interface and a Compact Flash (CF) card interface, etc.

The synchronous write method disclosed above may be executed by the main processor 1100, where the main processor 1100 is deployed with an input-output (IO) stack, which may be distributed in a file system layer, a driver layer, d the like. The synchronous write method provided by the present disclosure may be deployed in the driver layer, and the file system layer may be modified so the order preserving commands are no longer sent by the file system layer, which saves time in sending commands from the file system layer to the driver layer, and further increases the performance of the system.

Figure 5:
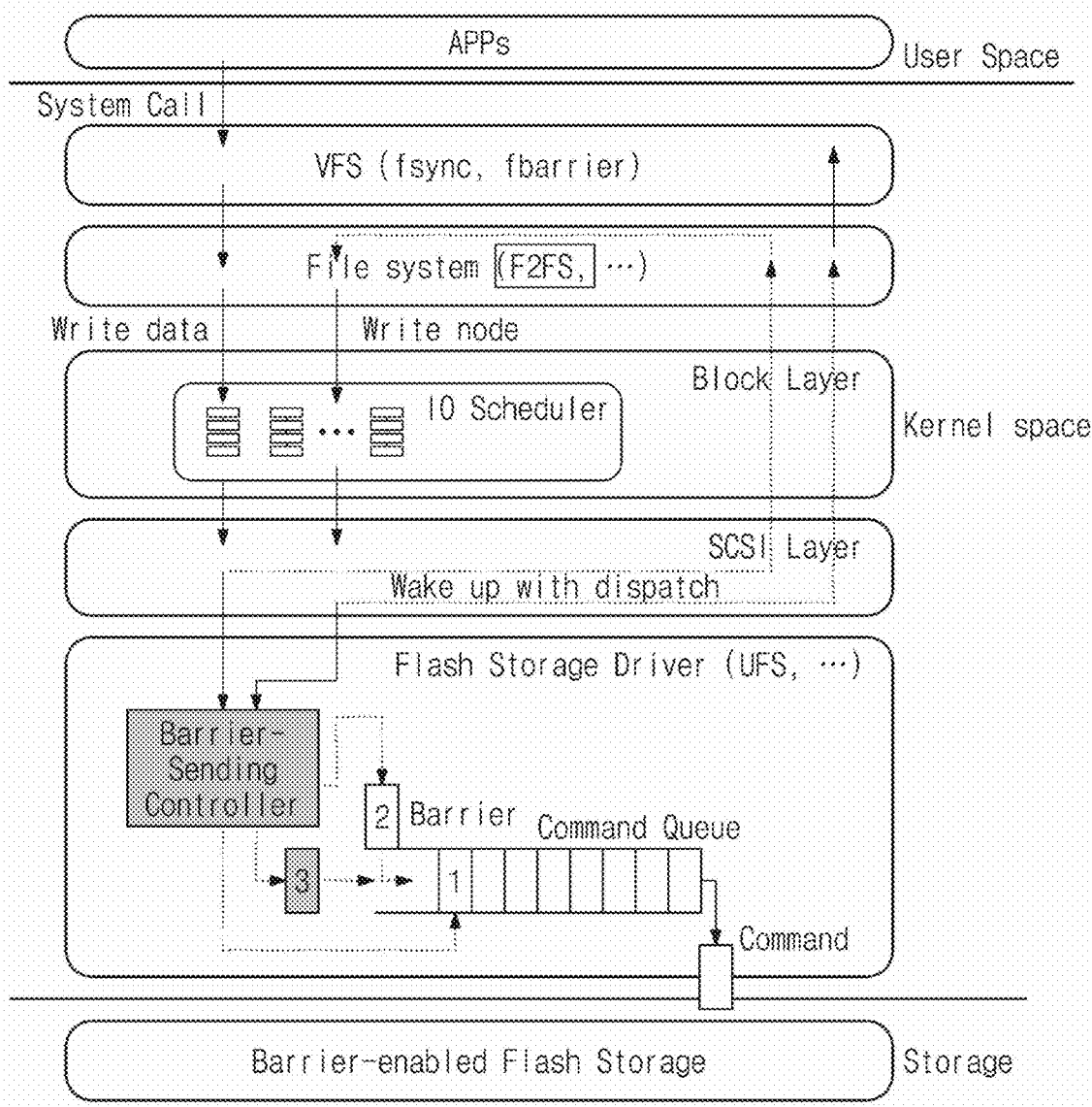
FIG. 5 is a schematic diagram of Barrier-enabled IO stack of a synchronous write method according to an embodiment of the present disclosure.

FIG. 5 schematically illustrates a barrier-enabled architecture of an IO stack of the synchronous write method of the present disclosure based on deployment on an ANDROID system. The architecture of the IO stack includes: a File system, a Block Layer, an SCSI Layer and a Flash Storage Driver. When an application interacts with the kernel through system calls, it calls the fsync( ) function to perform synchronous write operations. The fsync( ) assigns instructions to the File system corresponding to the file. The File system writes data pages to the Block Layer, and then the Block Layer sends data to the SCSI Layer after scheduling. The SCSI assigns the received data (Write data) to the device queue and then sends it to the Flash Storage Driver, and the Flash Storage Driver controller adds the command to the command queue. Previously, the IO stack continued to wait for the flash to return a write back flag to indicate that the transmission process completed. In an embodiment of the disclosure, the barrier-enabled SCSI Layer informs the Block Layer that the page is scheduled, so there is no need to wait for the write back flag. Then the file system continues to write the node (metadata) (Write node) to the Block Layer, and the node write is performed in the same way as described above.

As shown in FIG. 5, a controller may be added to the Flash Storage Driver. The controller may be implemented in software, and the controller may maintain the process state table, or the process state table and the LBA state table described in the above embodiments. The controller may determine whether it needs to add a barrier command between two synchronous write commands of the same process according to the process state table, or the process state table and the LBA state table, to ensure the order of the synchronous write commands, and to guarantee that the barrier commands issued to the storage device are reduced as much as possible. In this way, the performance of the storage device may be increased.

Figure 6:
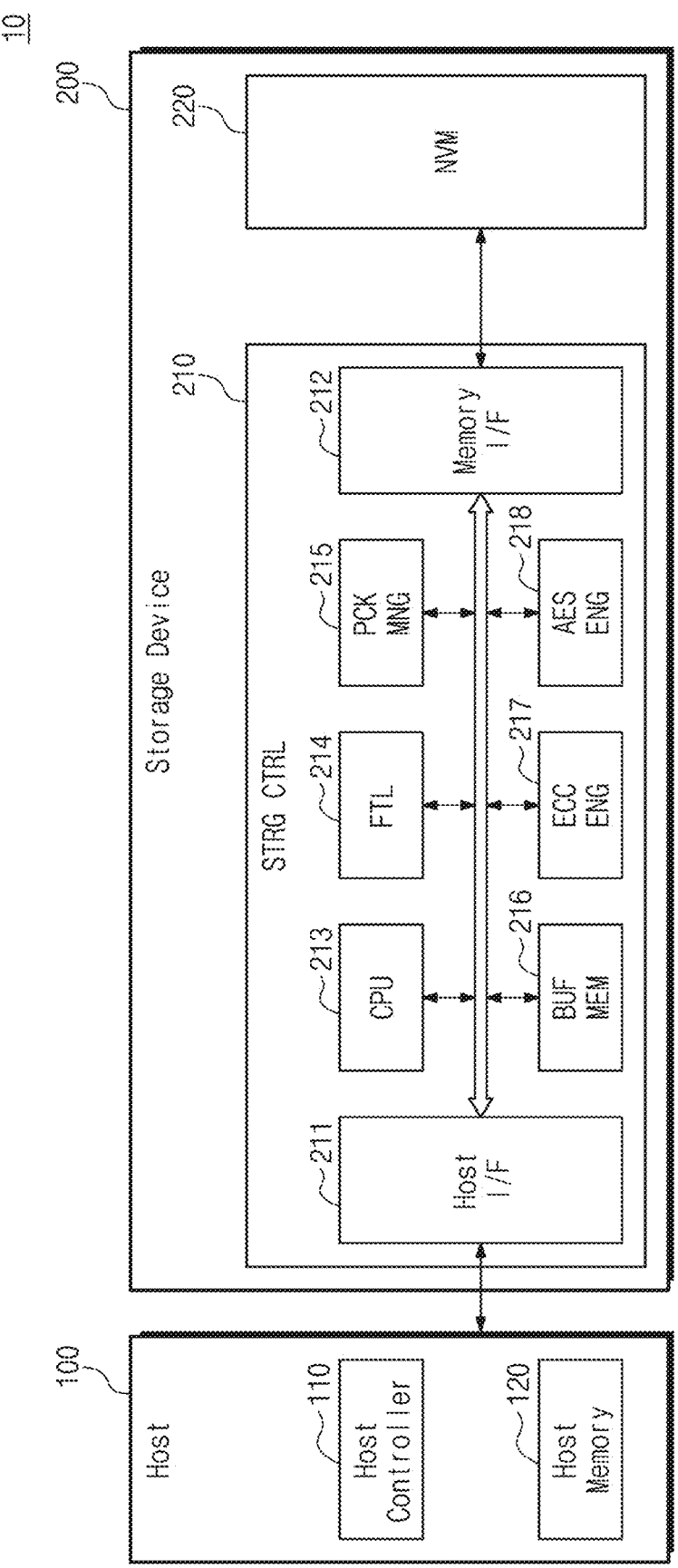
FIG. 6 is a schematic diagram of a host storage system according to exemplary embodiments of the present disclosure.

FIG. 6 illustrates a host storage system according to an exemplary embodiment of the present disclosure. As shown in FIG. 6, the host storage system 10 may include a host 100 and a storage device 200. Further, the storage device 200 may include a storage controller 210 and an NVM 220. According to an exemplary embodiment of the present disclosure, the host 100 may include a host controller 110 and a host memory 120. The host memory 120 may serve as a buffer memory, which is configured to temporarily store data to be sent to the storage device 200 or data received from the storage device 200.

The storage device 200 may include a storage medium, which is configured to store data in response to a request from the host 100. As an example, the storage device 200 may include at least one of an SSD, an embedded memory, and a removable external memory. When the storage device 200 is an SSD, the storage device 200 may be a device that complies to an NVMe standard. When the storage device 200 is an embedded memory or an external memory, the storage device 200 may be a device that complies to a UFS standard or an eMMC standard. Each of the host 100 and the storage device 200 may generate a packet according to the adopted standard protocol and send the packet.

When the NVM 220 of the storage device 200 includes a flash memory, the flash memory may include a 2D NAND memory array or a 3D (or vertical) NAND (VNAND) memory array. As another example, the storage device 200 may include various other kinds of NVMs. For example, the storage device 200 may include Magnetic Random Access Memory (MRAM), Spin-Transfer Torque MRAM, Conductive Bridging RAM (CBRAM), Ferroelectric RAM (FRAM), PRAM, RRAM, and various other kinds of memories.

According to an embodiment, the host controller 110 and the host memory 120 may be implemented as separate semiconductor chips. Alternatively, in some embodiments, the host controller 110 and the host memory 120 may be integrated in the same semiconductor chip. As an example, the host controller 110 may be any one of a plurality of modules included in an application processor (AP). The AP may be implemented as a System on Chip (SoC). Further, the host memory 120 may be an embedded memory included in the AP or memory module outside the AP.

The host controller 110 may manage an operation of storing data (for example, write data) of a buffer area of the host memory 120 in the NVM 220 or an operation of storing data (for example, read data) of the NVM 220 in the buffer region.

The storage controllers 210 may include a host interface 211, a memory interface 212 and a CPU 213. In addition, the storage controllers 210 may further include a Flash Translation Layer (FTL) 214, a package manager 215, a buffer memory 216, an Error Correction Code (ECC) engine 217, and an Advanced Encryption Standard (AES) engine 218. The storage controllers 210 may further include a working memory (not shown) in which an FTL 214 is loaded. The CPU 213 may execute the FTL 214 to control data writing and reading operations on the NVM 220.

The host interface 211 may send and receive packets to and from the host 100. A packet sent from the host 100 to the host interface 211 may include a command or data to be written to the NVM 220, and the like. A packet sent from the host interface 211 to the host 100 may include a response to a command or data read from the NVM 220, and the like. The memory interface 212 may send data to be written to the NVM 220 to the NVM 220 or receive data read from the NVM 220. The memory interface 212 may be configured to comply with standard protocols such as Toggle or Open NAND Flash Interface (ONFI).

The FTL 214 may perform various functions, such as address mapping operations, wear leveling operations, and garbage collection operations. The address mapping operation may be an operation of converting a logical address received from the host 100 into a physical address for actually storing data in the NVM 220. The wear leveling operation may be a technique that prevents excessive degradation of a specific block by allowing blocks of the NVM 220 to be used uniformly. As an example, the wear leveling operation may be implemented by using a firmware technology that balances erase counts of physical blocks. The garbage collection operation may be a technique for ensuring an available capacity in the NVM 220 by erasing an existing block after copying valid data of the existing block to a new block.

The packet manager 215 may generate packets according to a protocol of an interface of the same host 100, or parse various types of information from the packets received from the host 100. In addition, the buffer memory 216 may temporarily store data to be written to the NVM 220 or data to be read from the NVM 220. Although the buffer memory 216 may be a component included in the storage controllers 210, the buffer memory 216 may be outside the storage controllers 210.

The ECC engine 217 may perform error detection and correction operations on the read data read from the NVM 220. More specifically, the ECC engine 217 may generate a parity bit for write data to be written to the NVM 220, and the generated parity bit may be stored in the NVM 220 together with the write data. During the reading of data from the NVM 220, the ECC engine 217 may correct errors in the read data by using the parity bit read from the NVM 220 along with the read data, and output the read data after error correction.

The AES engine 218 may perform at least one of an encryption operation and a decryption operation on data input to the storage controllers 210 by using a symmetric key algorithm.

The synchronous write method disclosed above may be executed by the host controller 110 to write data to the storage device 200 in orderly manner.

Figure 7:
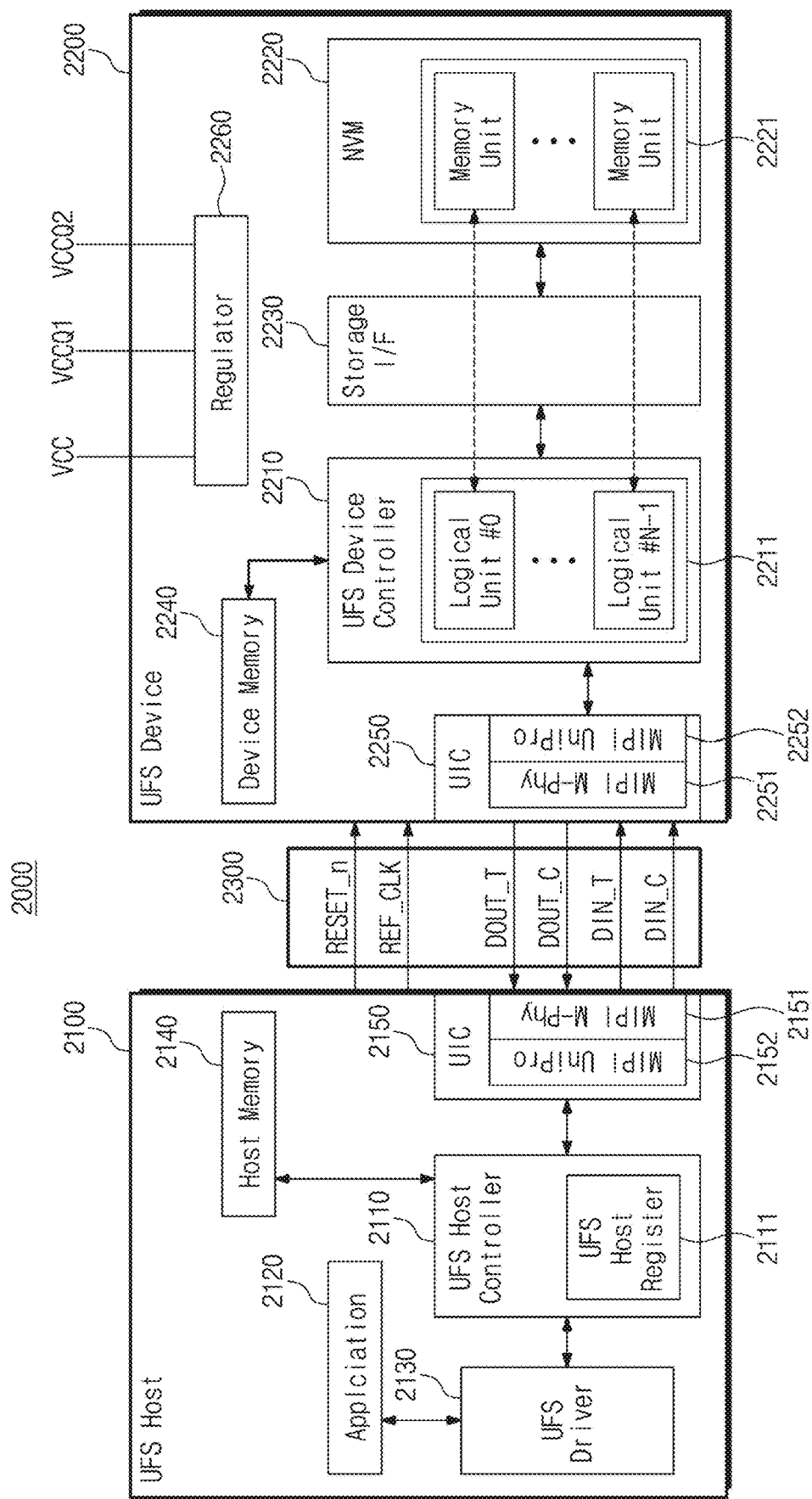
FIG. 7 is a schematic diagram of a UFS system according to an exemplary embodiment of the present disclosure.

FIG. 7 illustrates a UFS system 2000 according to an exemplary embodiment of the disclosure. The UFS system 2000 may be a system that complies to a UFS standard announced by the Joint Electron Device Engineering Council (JEDEC) and includes a UFS host 2100, a UFS device 2200 (corresponding to the above UFS device) and a UFS interface 2300. The UFS host 2100 may be connected to the UFS device 2200 through the UFS interface 2300. When the main processor 1100 of FIG. 4 is an application processor (AP), the UFS host 2100 may be implemented as a part of the AP. The UFS host controller 2110 and the host memory 2140 may respectively correspond to the controller 1120 of the main processor 1100 and the memories 1200a and 1200b of FIG. 4. The UFS device 2200 may correspond to the storage devices 1300a and 1300b of FIG. 4, and the UFS device controller 2210 and the NVM 2220 may respectively correspond to the storage controllers 1310a and 1310b and the NVMs 1320a and 1320b of FIG. 4.

The UFS host 2100 may include a UFS host controller 2110, an application 2120, a UFS driver 2130, a host memory 2140, and a UFS Connect (UIC) layer 2150. The UFS device 2200 may include a UFS device controller 2210, an NVM 2220, a storage interface 2230, a device memory 2240, a UIC layer 2250, and a regulator 2260. The NVM 2220 may include a plurality of memory units 2221. Although each memory unit 2221 may include a V-NAND flash memory having a 2D structure or a 3D structure, each memory unit 2221 may include another kind of NVM, such as PRAM and/or RRAM. The UFS device controller 2210 may be connected to the NVM 2220 through the storage interface 2230. The storage interface 2230 may be configured to comply with a standard protocol such as Toggle or ONFI.

The application 2120 may refer to a program that wants to communicate with the UFS device 2200 to use functions of the UFS device 2200. The application 2120 may send Input-Output Request (IOR) to the UFS driver 2130 for Input/Output (I/O) operations on the UFS device 2200. The IOR may refer to a data read request, a data storage (or write) request, and/or a data erasure (or discard) request, but it is not limited thereto.

The UFS driver 2130 may manage the UFS host controller 2110 through a UFS-Host Controller Interface (UFS-HCI). The UFS driver 2130 may convert the IOR generated by the application 2120 into a UFS command defined by the UFS standard, and send the UFS command to the UFS host controller 2110. One IOR may be converted into multiple UFS commands Although the UFS command may basically be defined by the SCSI standard, the UFS command may be a command dedicated to the UFS standard.

The UFS host controller 2110 may send the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a Command Queue (CQ).

Referring to FIG. 7, the synchronous write method in the present disclosure may be applied to the UFS driver 2130. The UFS driver 2130 may maintain a process state table, or a process state table and an LBA state table. After receiving the synchronous write command issued by the UFS host controller 2110, it is determined whether to add a Barrier command in the command queue according to the process state table, or the process state table and the LBA state table. For guaranteeing that synchronous write commands are written to the UFS device 2200 in a multi-threaded environment, the number of Barriers issued may also be reduced as much as possible, and the performance of the UFS device 2200 may be increased.

Figure 8:
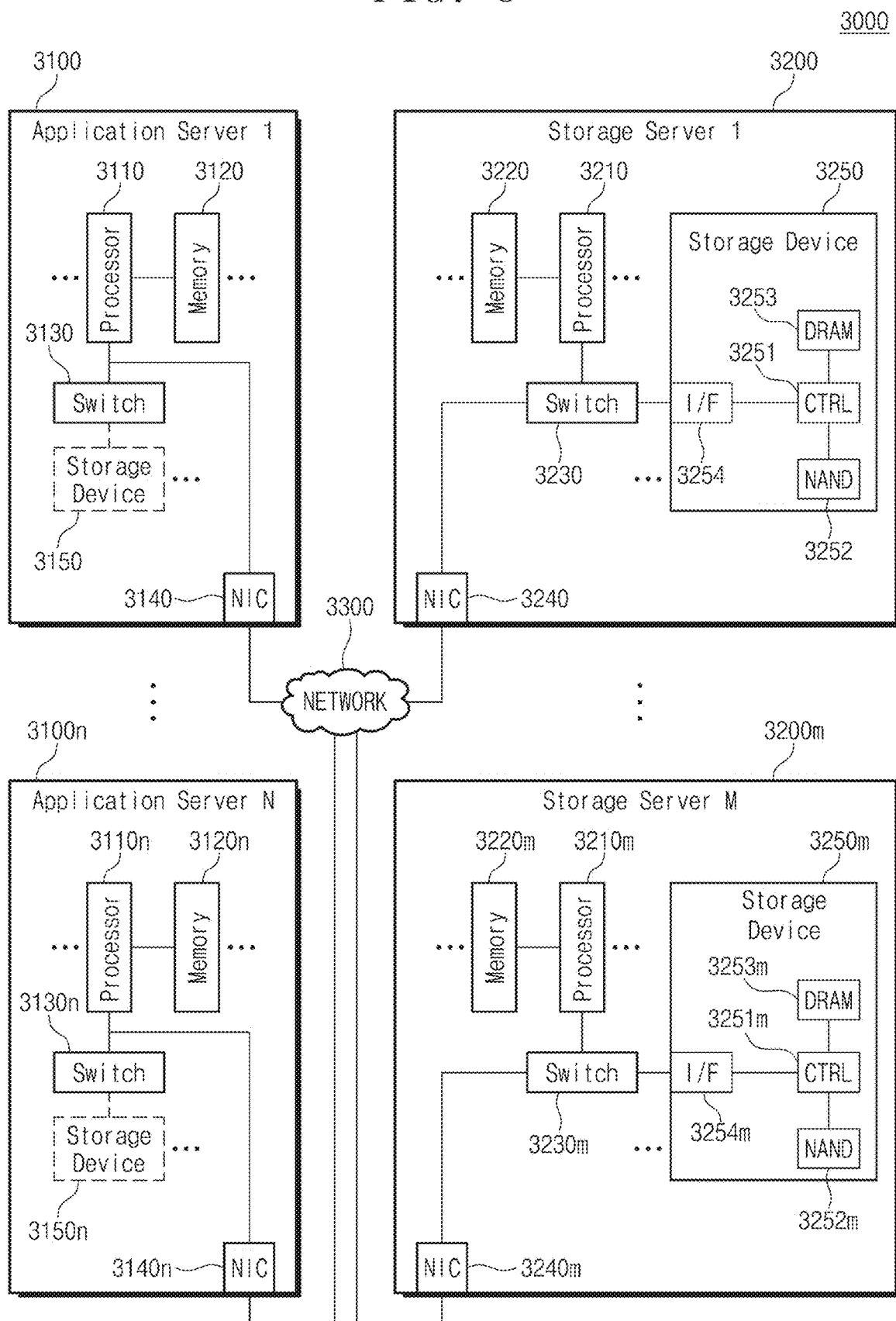
FIG. 8 is a schematic diagram of a data center according to an exemplary embodiment of the present disclosure.

FIG. 8 illustrates a data center 3000 to which the synchronous write method of the above embodiment is applied. As shown in FIG. 8, the data center 3000 may be a facility that collects various types of data and provides services, and be referred to as data storage center. The data center 3000 may be a system for operating a search engine and a database, and may be a computing system used by a company, such as a bank or a government agency. The data center 3000 may include application servers 3100 to 3100n and storage servers 3200 to 3200m. According to an embodiment, the number of application servers 3100 to 3100n and the number of storage servers 3200 to 3200m may be variously selected. The number of application servers 3100 to 3100n may be different from the number of storage servers 3200 to 3200m.

The application server 3100 or the storage server 3200 may include at least one of processors 3110 and 3210 and memories 3120 and 3220. The storage server 3200 will now be described herein as an example. The processor 3210 may control all operations of the storage server 3200, access the memory 3220, and execute instructions and/or data loaded in the memory 3220. The memory 3220 may be a Double Data Rate Synchronous DRAM (DDR SDRAM), a High Bandwidth Memory (HBM), a Hybrid Memory Cube (HMC), a Dual In-Line Memory Module (DIMM), an Optane DIMM or a Non-Volatile DIMM (NVMDIMM). In one embodiment, the number of processors 3210 and memories 3220 included in the storage server 3200 may be variously selected. In an embodiment, the processor 3210 and the memory 3220 may provide a processor-memory pair. In an embodiment, the number of processors 3210 may be different from the number of memories 3220. The processor 3210 may include a single-core processor or a multi-core processor. The above description of the storage server 3200 may be similarly applied to the application server 3100. In some embodiments, the application server 3100 may not include a storage device 3150. The storage server 3200 may include at least one storage device 3250. According to the embodiments, the number of storage device 3250 included in the storage server 3200 may be variously selected.

Hereinafter, the application server 3100 and the storage server 3200 will be mainly described. The description of the application server 3100 may be applied to another application server 3100n, and the description of the storage server 3200 may be applied to another storage server 3200m.

The application server 3100 may store the data requested by a user or a client for storage in one of the storage servers 3200 to 3200m through a network 3300. Also, the application server 3100 may obtain the data requested by the user or the client to be read, from one of the storage servers 3200 to 3200m through the network 3300. For example, the application server 3100 may be implemented as a web server or a Database Management System (DBMS).

The application server 3100 may access a memory 3120n or a storage device 3150n included in another application server 3100n through the network 3300. Alternatively, the application server 3100 may access the memories 3220 to

3220m or the storage devices 3250 to 3250m, which are included in the storage servers 3200 to 3200m through the network 3300. Therefore, the application server 3100 may perform various operations on the data stored in the application servers 3100 to 3100n and/or the storage servers 3200 to 3200m. For example, the application server 3100 may execute instructions for moving or copying data between the application servers 3100 to 3100n and/or the storage servers 3200 to 3200m. In this case, the data may be moved from the storage devices 3250 to 3250m of the storage servers 3200 to 3200m to the memories 3120 to 3120n of the application servers 3100 to 3100n directly or through the memories 3220 to 3220m of the storage servers 3200 to 3200m. The data moved through the network 3300 may be encrypted data for safety or privacy.

The method of the present disclosure may be executed by the application server 3100 as shown in FIG. 8.

Figure 9:
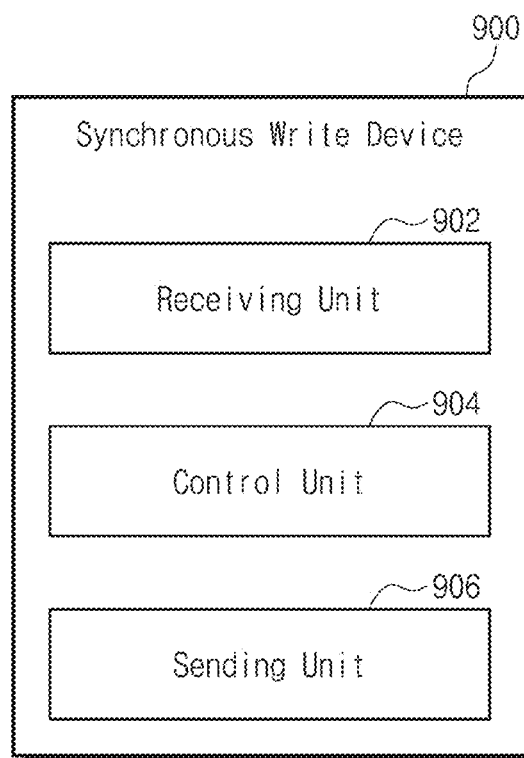
FIG. 9 is a block diagram of a synchronous write device according to an exemplary embodiment of the present disclosure.

FIG. 9 illustrates a synchronous write device according to an exemplary embodiment of the present disclosure. Referring to FIG. 9, the storage device 900 includes: a receiving unit 902 (e.g., a receiver), a control unit 904 (e.g., control circuit, processor, etc.) and a sending unit 906 (e.g., a transmitter).

The receiving unit 902 is configured to receive a first synchronous write command of a first process.

The control unit 904 is configured to, if a process state table indicates that at least one other synchronous write command of the first process has not been added to a command queue, add the first synchronous write command to the command queue. The process state table is used to indicate whether other synchronous write commands of a process have been added to the command queue. If the process state table indicates that at least one other synchronous write command of the first process has been added to the command queue, the control unit 904 is configured to add an order preserving command to the command queue, and then add the first synchronous write command to the command queue. The order preserving command is used to indicate that synchronous write commands located before the order preserving command in the command queue is executed prior to the first synchronous write command by a storage device.

The sending unit 906 is configured to send commands in the command queue to the storage device according to the order of the commands in the command queue.

In an embodiment of the present disclosure, the process state table includes process state information; the control unit 904 is further configured to, if process state information of the first process in the process state table indicates that at least one other synchronous write command of the first process has not been added to the command queue, change the process state information of the first process to indicate that other synchronous write commands of the first process have been added to the command queue, after adding the first synchronous write command to the command queue. If the process state information of the first process in the process state table indicates that at least one other synchronous write command of the first process has been added to the command queue, the control unit 904 is configured to change process state information of other processes in the process state table to indicate that no synchronous write command of the other processes have been added to the command queue, after adding the order preserving command to the command queue.

In an embodiment of the present disclosure, the process state table includes a process identification number. In this embodiment, the control unit 904 is further configured to, if the process state table does not include the process identification number of the first process after receiving the first synchronous write command of the first process, determine that the process state table indicates that other synchronous write commands of the first process have not been added to the command queue. In this embodiment, if the process state table includes the process identification number of the first process, the control unit 904 is configured to determine that the process state table indicates that other synchronous write commands of the first process have been added to the command queue.

In an embodiment of the present disclosure, the control unit 904 is further configured to update the process state table, if the process state table indicates that at least one other synchronous write command of the first process has not been added to the command queue, save the process identification number of the first process in the process state table after adding the first synchronous write command to the command queue. In this embodiment, if the process state table indicates that at least one other synchronous write command of the first process has been added to the command queue, the control unit 904 is configured to remove process identification numbers of other processes in the process state table after adding the order preserving command to the command queue.

In an embodiment of the present disclosure, the process state table further includes the type of a synchronous write command that has been added to the command queue last time. The type of the synchronous write command may indicate whether the synchronous write command points to a data page or a node page. In an embodiment, the control unit 904 is further configured to determine the type of the first synchronous write command of the first process and the type of the synchronous write command that has been added to the command queue last time. If the process state table indicates that at least one other synchronous write command of the first process has been added to the command queue, and the type of the first synchronous write command of the first process is different from the type of the synchronous write command that has been added to the command queue last time, the control unit 904 is configured to add the order preserving command to the command queue, and then add the first synchronous write command to the command queue.

In an embodiment of the present disclosure, the control unit 904 is further configured to maintain a logical address table indicating whether an address corresponding to the storage device has written data, if the process state table indicates that at least one other synchronous write command of the first process has been added to the command queue, and the types of the first synchronous write command that carries a logical address and the synchronous write command that has been added to the command queue last time are both synchronous write commands pointing to a data page, determine, according to the logical address state table, whether data has been written to the logical address carried by the first synchronous write command, and if the data has been written, add the order preserving command to the command queue, and then add the first synchronous write command to the command queue.

In an embodiment of the present disclosure, the control unit 904 is further configured to change states of other logical addresses in the logical address state table to not having written data after adding the order preserving command to the command queue.

It should be understood that each unit/module in the storage method and the storage device according to the exemplary embodiments of the present disclosure may be implemented as a hardware component and/or a software component. According to the processing executed by each defined unit/module, those skilled in the art may, for example, use a Field-Programmable Gate Array (FPGA) or an Application-Specific Integrated Circuit (ASIC) to implement each unit/module.

According to an exemplary embodiment of the present disclosure, there is provided a storage system, including: a file system layer, a driver layer and a storage device, wherein the file system layer issues a first synchronous write command of a first process to the driver layer, and the driver layer executes the above synchronous write method.

According to an exemplary embodiment of the present disclosure, there is provided a computer-readable storage medium storing a computer program and when the computer program is executed by a processor, the computer program implements the storage method of the present disclosure (e.g., the synchronous write method).

Specifically, the method for performing a synchronous write according to an exemplary embodiment of the present disclosure may be written as a computer program, a code segment, an instruction, or any combination thereof, and recorded, stored, or fixed in one or more non-transitory computer-readable storage media or on one or more non-transitory computer-readable storage media. The computer-readable storing medium is a storage device that may store any data of data read by a computer system. Examples of a computer-readable storing medium include: a read-only memory, a random-access memory, a CD-ROM, a magnetic tape, a floppy disk, an optical data storage apparatus and a carrier (such as data transmission through Internet through a wired or wireless transmission path).

According to an exemplary embodiment of the present disclosure, there is provided an electronic device, wherein the electronic device includes: at least one processor; and at least one memory storing computer executable instructions. The computer executable instructions, while being executed by the at least one processor, cause the at least one processor to execute the synchronous write method of the present disclosure.

The electronic device may a tablet computer, a smart phone, a smart watch, or any other electronic devices with necessary computing and/or processing capabilities. In one embodiment, the electronic device may include a processor, a memory, a network interface, a communication interface, etc. connected through a system bus. The processor of the electronic device may be used to provide necessary computing, processing and/or controlling capabilities. The memory of the electronic device may include a non-volatile storage medium and an internal memory. An operating system, a computer program, etc. may be stored in or on the non-volatile storage medium. The internal memory may provide an environment for the operation of the operating system and the computer program in the non-volatile storage medium. The network interface and communication interface of the electronic device may be used to connect and communicate with external devices through a network.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A synchronous write method, comprising:
   receiving a first synchronous write command of a first process;
   if a process state table indicates that at least one other synchronous write command of the first process has not been added to a command queue, adding the first synchronous write command to the command queue;
   if the process state table indicates the at least one other synchronous write command of the first process has been added to the command queue, adding an order preserving command to the command queue, and then adding the first synchronous write command to the command queue, wherein the order preserving command is used to indicate that a synchronous write command located before the order preserving command in the command queue is to be executed prior to the first synchronous write command by a storage device; and
   sending commands in the command queue to the storage device according to the order of the commands in the command queue.

2. The synchronous write method according to claim 1, wherein the process state table comprises process state information, the method further comprising:
   if the process state information of the first process in the process state table indicates that at least one other synchronous write command of the first process has not been added to the command queue, changing the process state information of the first process to indicate that at least one other synchronous write command of the first process has been added to the command queue, after adding the first synchronous write command to the command queue; and
   if the process state information of the first process in the process state table indicates that at least one other synchronous write command of the first process has been added to the command queue, changing process state information of at least one other process in the process state table to indicate that no synchronous write command of the least one other process has been added to the command queue, after adding the order preserving command to the command queue.

3. The synchronous write method according to claim 1, after receiving the first synchronous write command of the first process, the method further comprising:
   if the process state table does not comprise a process identification number of the first process, determining that the process state table indicates that the at least one other synchronous write command of the first process has not been added to the command queue; and
   if the process state table comprises the process identification number of the first process, determining that the process state table indicates that the at least one other synchronous write command of the first process has been added to the command queue.

4. The synchronous write method according to claim 3, the method further comprising:
   if the process state table indicates that the least one other synchronous write command of the first process has not been added to the command queue, saving the process identification number of the first process in the process state table after adding the first synchronous write command to the command queue; and
   if the process state table indicates that the at least one other synchronous write command of the first process has been added to the command queue, removing process identification numbers of at least one other process in the process state table after adding the order preserving command to the command queue.

5. The synchronous write method according to claim 1, wherein the process state table further comprises a type of a synchronous write command that has been added to the command queue last time, wherein the type indicates whether the synchronous write command points to a data page or a node page, and the method further comprising:
   determining the type of the first synchronous write command of the first process and the type of the synchronous write command that has been added to the command queue last time; and
   if the process state table indicates that the at least one other synchronous write command of the first process has been added to the command queue, and the type of the first synchronous write command of the first process is different from the type of the synchronous write command that has been added to the command queue last time, adding the order preserving command to the command queue, and then adding the first synchronous write command to the command queue.

6. The synchronous write method according to claim 5, the method further comprising:
   if the process state table indicates that the at least one other synchronous write command of the first process has been added to the command queue, and the types of the first synchronous write command that carries a logical address and the synchronous write command that has been added to the command queue last time are both synchronous write commands pointing to a data page,
   determining, according to a logical address state table, whether data has been written to the logical address carried by the first synchronous write command; and
   if the data has been written, adding the order preserving command to the command queue, and then adding the first synchronous write command to the command queue.

7. The synchronous write method according to claim 6, after adding the order preserving command to the command queue, the method further comprising:
   changing states of other logical addresses in the logical address state table to not having written data.

8. A synchronous write device, comprising:
   a receiver configured to receive a first synchronous write command of a first process;
   a controller configured to, if a process state table indicates that at least one other synchronous write command of the first process has not been added to a command queue, add the first synchronous write command to the command queue, and
   if the process state table indicates that the at least one other synchronous write command of the first process has been added to the command queue, add an order preserving command to the command queue, and then add the first synchronous write command to the command queue, wherein the order preserving command indicates that an synchronous write command located before the order preserving command in the command queue is to be executed prior to the first synchronous write command by a storage device; and
   a transmitter configured to send commands in the command queue to the storage device according to the order of the commands in the command queue.

9. The synchronous write device according to claim 8, wherein the process state table comprises process state information, and
   the controller is further configured to, if the process state information of the first process in the process state table indicates that at least one other synchronous write command of the first process has not been added to the command queue, change the process state information of the first process to indicate that at least one other synchronous write command of the first process has been added to the command queue, after adding the first synchronous write command to the command queue, and
   if the process state information of the first process in the process state table indicates that the at least one other synchronous write commands of the first process has been added to the command queue, change process state information of at least one other process in the process state table to indicate that no synchronous write command of the at least one other process is added to the command queue, after adding the order preserving command to the command queue.

10. The synchronous write device according to claim 8, wherein the controller is further configured to, if the process state table does not comprise a process identification number of the first process after receiving the first synchronous write command of the first process, determine that the process state table indicates that at least one other synchronous write command of the first process has not been added to the command queue, and if the process state table comprises the process identification number of the first process, determining that the process state table indicates that at least one other synchronous write command of the first process has been added to the command queue.

11. The synchronous write device according to claim 10, wherein the controller is further configured to update the process state table,
   if the process state table indicates that the at least one other synchronous write command of the first process has not been added to the command queue, save the process identification number of the first process in the process state table after adding the first synchronous write command to the command queue, and
   if the process state table indicates that the at least one other synchronous write command of the first process has been added to the command queue, remove process identification numbers of at least one other process in the process state table after adding the order preserving command to the command queue.

12. The synchronous write device according to claim 8, wherein the process state table further comprises the type of a synchronous write command that has been added to the command queue last time, the type indicating whether the synchronous write command points to a data page or a node page, and
   the controller is further configured to determine the type of the first synchronous write command of the first process and the type of the synchronous write command that has been added to the command queue last time, and
   if the process state table indicates that the least one other synchronous write command of the first process has been added to the command queue, and the type of the first synchronous write command of the first process is different from the type of the synchronous write command that has been added to the command queue last time, add the order preserving command to the command queue, and then add the first synchronous write command to the command queue.

13. The synchronous write device according to claim 12, wherein the controller is further configured to maintain a logical address table indicating whether an address corresponding to the storage device has written data, if the process state table indicates that the at least one other synchronous write command of the first process has been added to the command queue, and the types of the first synchronous write command that carries a logical address and the synchronous write command that has been added to the command queue last time are both synchronous write commands pointing to a data page, determine, according to the logical address state table, whether data has been written to the logical address carried by the first synchronous write command, and if the data has been written, add the order preserving command to the command queue, and then add the first synchronous write command to the command queue.

14. The synchronous write device according to claim 13, wherein the controller is further configured to change states of other logical addresses in the logical address state table to not having written data after adding the order preserving command to the command queue.

15. A universal flash system, comprising:
a universal flash host;
a universal flash interface; and
a universal flash device configured to communicate with the universal flash host through the universal flash interface,
wherein the universal flash host is configured to control the universal flash host to store data according to the synchronous write method of claim 1.

16. The synchronous write method according to claim 15, wherein the process state table comprises process state information, the method further comprising:

if the process state information of the first process in the process state table indicates that at least one other synchronous write command of the first process has not been added to the command queue, changing the process state information of the first process to indicate that at least one other synchronous write command of the first process has been added to the command queue, after adding the first synchronous write command to the command queue; and if the process state information of the first process in the process state table indicates that at least one other synchronous write command of the first process has been added to the command queue, changing process state information of at least one other process in the process state table to indicate that no synchronous write command of the least one other process has been added to the command queue, after adding the order preserving command to the command queue.

17. The synchronous write method according to claim 15, after receiving the first synchronous write command of the first process, the method further comprising:

if the process state table does not comprise a process identification number of the first process, determining that the process state table indicates that the at least one other synchronous write command of the first process has not been added to the command queue; and if the process state table comprises the process identification number of the first process, determining that the process state table indicates that the at least one other synchronous write command of the first process has been added to the command queue.

18. The synchronous write method according to claim 17, the method further comprising:

if the process state table indicates that the least one other synchronous write command of the first process has not been added to the command queue, saving the process identification number of the first process in the process state table after adding the first synchronous write command to the command queue; and if the process state table indicates that the at least one other synchronous write command of the first process has been added to the command queue, removing process identification numbers of at least one other process in the process state table after adding the order preserving command to the command queue.

19. The synchronous write method according to claim 15, wherein the process state table further comprises a type of a synchronous write command that has been added to the command queue last time, wherein the type indicates whether the synchronous write command points to a data page or a node page, and the method further comprising:

determining the type of the first synchronous write command of the first process and the type of the synchronous write command that has been added to the command queue last time; and if the process state table indicates that the at least one other synchronous write command of the first process has been added to the command queue, and the type of the first synchronous write command of the first process is different from the type of the synchronous write command that has been added to the command queue last time, adding the order preserving command to the command queue, and then adding the first synchronous write command to the command queue.

20. The synchronous write method according to claim 19, the method further comprising:

if the process state table indicates that the at least one other synchronous write command of the first process has been added to the command queue, and the types of the first synchronous write command that carries a logical address and the synchronous write command that has been added to the command queue last time are both synchronous write commands pointing to a data page, determining, according to a logical address state table, whether data has been written to the logical address carried by the first synchronous write command; and if the data has been written, adding the order preserving command to the command queue, and then adding the first synchronous write command to the command queue.

* * * * *